United States Patent
Chandavasu et al.

(10) Patent No.: US 6,824,680 B2
(45) Date of Patent: Nov. 30, 2004

(54) PREPARATION OF MICROPOROUS FILMS FROM IMMISCIBLE BLENDS VIA MELT PROCESSING AND STRETCHING

(75) Inventors: Chaiya Chandavasu, Bangna (TH); Marino Xanthos, Fort Lee, NJ (US); Kamalesh K. Sirkar, Bridgewater, NJ (US); Costas Gogos, Wyckoff, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 0 days.

(21) Appl. No.: 09/851,496

(22) Filed: May 7, 2001

(65) Prior Publication Data

US 2002/0180082 A1 Dec. 5, 2002

(51) Int. Cl.$^7$ ............................................. B01D 71/06
(52) U.S. Cl. ......................... 210/500.27; 210/500.36; 264/46.1; 264/290.2; 264/288.8; 428/304.5; 428/315.5
(58) Field of Search ...................... 210/500.27, 500.23, 210/500.36; 264/504, 46.1, 41, 156, 80, 83, 479, 480, 483; 427/223, 322, 412, 533, 340, 388.1; 428/141, 143, 147, 182, 185, 304.4, 315.5, 315.7

(56) References Cited

U.S. PATENT DOCUMENTS

| | | | |
|---|---|---|---|
| 3,426,754 A | * | 2/1969 | Bierenbaum et al. ....... 604/307 |
| 3,801,404 A | | 4/1974 | Druin et al. |
| 3,843,761 A | | 10/1974 | Bierenbaum et al. |
| 4,138,459 A | | 2/1979 | Brazinsky et al. |
| 4,366,062 A | | 12/1982 | Kurihara et al. |
| 4,791,144 A | | 12/1988 | Nagou et al. |
| 4,867,881 A | | 9/1989 | Kinzer |
| 5,013,439 A | | 5/1991 | Fisher et al. |
| 5,643,681 A | | 7/1997 | Voorhees et al. |
| 5,690,949 A | | 11/1997 | Weimer et al. |
| 5,962,544 A | | 10/1999 | Waller, Jr. |
| 6,217,687 B1 | * | 4/2001 | Shibata et al. ................. 156/82 |
| 6,331,343 B1 | * | 12/2001 | Perez et al. .................. 428/141 |
| 6,444,302 B1 | * | 9/2002 | Srinivas et al. .......... 428/315.5 |

FOREIGN PATENT DOCUMENTS

JP 58-020273 * 2/1983

OTHER PUBLICATIONS

Bierenbaum et al. Ind. Eng. Chem., Prod. Res.Develop. vol. 13: (No. 1) pp. 2–9 (1974).

* cited by examiner

Primary Examiner—W. L. Walker
Assistant Examiner—Krishnan S Menon
(74) Attorney, Agent, or Firm—Klauber & Jackson

(57) ABSTRACT

The invention is directed broadly to microporous films prepared from immiscible blends of at least two components, preferably polymers, which are produced via melt processing, a film formed therefrom, for example by extrusion and post-film-forming treatments comprising uniaxial or biaxial cold-stretching and hot-stretching. The films have a three-dimensional reticulated or interconnected network of microcracks or crazing throughout the film, extending from one surface of the film to the other, providing a stable porosity and pore size useful for a variety of filtration and other applications.

34 Claims, 9 Drawing Sheets

PREPARATION OF MICROPOROUS FILMS FROM IMMISCIBLE BLENDS VIA MELT PROCESSING AND STRETCHING

BACKGROUND OF THE INVENTION

In recent years, membrane separations have been used extensively in commercial processes such as gas separation, liquid separation, wastewater treatment, etc. A membrane is a thin semipermeable barrier that is capable of separating components of a chemical solution or particles from a fluid as a function of their chemical and physical properties when a suitable driving force is applied across the membrane. Membranes can control species transfer rates from one region to the other. Microporous flat film membranes based on homopolymers for such processes can be produced via a melt process followed by a stretching step. The process used for producing this type of microporous films is well known (e.g., M. L. Druin, J. T. Loft, and S. G. Plovan, "Novel open-celled microporous film," U.S. Pat. No. 3,801,404 (1974); H. S. Bierenbaum, R. B. Isaacson, M. D. Druin, and S. G. Plovan, "Microporous polymeric films," *I&EC Prod. Res. Develop*, 13, 2 (1974); H. S. Bierenbaum, L. R. Daley, D. Zimmerman, and I. L. Hay, "Process for preparing a thermoplastic microporous film involving a cold stretching step and multiple hot stretching steps," U.S. Pat. No. 3,843,761 (1974); and Brazinsky, W. M. Cooper, and A. S. Gould, "Process for preparing a microporous polymer film," U.S. Pat. No. 4,138,459 (1979)). However, to date, membranes having pore size as small as about 1 nm and ranging up to about 200 nm that can be used in severe chemical and high temperature environments have not been produced by a melt process involving multicomponent, multiphase systems.

It is toward the fabrication of microporous flat film membranes having a pore size as small as 1 nm and having significant chemical resistance and thermal stability based on immiscible polymer blends, made by a melt process and post-film-forming treatments that are environment-friendly and economically viable, that the present invention is directed.

The citation of any reference herein should not be deemed as an admission that such reference is available as prior art to the instant invention.

SUMMARY OF THE INVENTION

In its broadest aspect, the present invention extends to a microporous membrane which is prepared by a melt process from an immiscible blend of a major and minor component, optionally further including a compatibilizing block copolymer, and extruded into a precursor film, the precursor film subsequently stretched to provide a stable reticulated or interconnected network of microcracks or crazes throughout the membrane, with a resultant porosity and pore size. The major component of the immiscible blend is preferably a polymer or a copolymer. The major component may be a polyolefin polymer, such as by way of non-limiting examples, polypropylene, polyethylene, and poly(4-methyl-1-pentene). The minor component of the immiscible blend is a component immiscible with the major component and is preferably a polymer, such as an immiscible polyolefin, polystyrene, a polyester or a copolymer, and may be present at about 1 percent to about 40 percent by weight of the total. A compatibilizing block copolymer, selected to increase the compatibility between the immiscible major and minor polymers or copolymers, may optionally be present at about 0.5 percent to about 25 percent of the total. An example of a compatibilizing block copolymer for a blend of polypropylene with polystyrene is hydrogenated styrene isoprene/butadiene block copolymer (SEEPS). Optional additional components may be included in the blend, such as a monomer, oligomer or surfactant, to impart certain characteristics to the surfaces of the microcracks.

In a process for preparing the microporous membrane, melt blending is carried out to uniformly disperse the minor component within the major component, including the optional compatibilizing block copolymer, and a non-porous precursor film is formed therefrom, for example by extrusion. The nonporous precursor film may be about 50 to about 300 micrometers in thickness, and comprises a matrix of major polymer in which inclusions or domains of the minor component are uniformly dispersed. Following extrusion, the precursor film is uniaxially or biaxially stretched in at least two steps to a final dimension by about 100% to about 700% with respect to the original dimension. A first cold-stretching step is performed at a temperature from about 15° C. to about 25° C., increasing the dimension of the precursor film in the stretching direction about 20 percent to about 30 percent, and the film is held under tension thereafter. In a second, hot-stretching step, the cold-stretched film is further stretched at a temperature of about 5° C. to about 15° C. below the glass transition temperature of the minor component, to a total increase in dimension of 100 percent to about 700 percent of the original dimension of the precursor film. After post-film-forming treatment, the film may be about 10 micrometers to about 50 micrometers in thickness. The film produced by the foregoing method comprises a matrix of the major polymer with inclusions or domains of the minor polymer distributed uniformly therein, the major polymer further comprising a three-dimensional reticulated or interconnected network of uniformly distributed microcracks of relatively uniform dimensions. If an optional compatibilizing block copolymer is used, the block copolymer may be found coating the minor component inclusion particles. Other optional components present in the blend and present at the surfaces of the microcracks may impart characteristics to the microcracks such as hydrophilicity. The pore size of the film may be from about 1 to about 200 nanometers, and the porosity about 5 percent to about 30 percent or higher.

In a further aspect of the invention, the invention is drawn to a microporous membrane or film of about 10 to about 50 micrometers in thickness comprising a major component with inclusions or domains of a minor component distributed uniformly therein, the inclusions or domains of the minor component optionally coated by a compatibilizing block copolymer, the major component further comprising a three-dimensional reticulated or interconnected network of uniformly distributed reticulated or interconnected microcracks of relatively uniform dimensions. The pore size may be from about 1 to about 200 nanometers, and the porosity about 5 percent to about 30 percent or higher. The major component is preferably a polymer, such as a polyolefin, examples including but not limited to polypropylene, polyethylene or poly(4-methyl-1-pentene). The minor component is immiscible with the major component and is preferably a polymer, such as an immiscible polyolefin, polystyrene or a polyester, and may be present at about 1 percent to about 40 percent by weight of the total. The optional compatibilizing block copolymer may be present at about 0.5 percent to about 25 percent of the total.

In yet a further aspect, a process for the preparation of a microporous membrane of about 10 to about 50 micrometers in thickness comprising a major component with inclusions or domains of a minor component distributed uniformly therein, the inclusions or domains of the minor component optionally coated with a compatibilizing block copolymer, the major component further comprising a three-dimensional reticulated or interconnected network of uniformly distributed microcracks of uniform dimensions of about 1 to about 200 nanometers, the major component being preferably a polymer, such as a polyolefin, and the minor component immiscible with the major component being present at about 5 to about 25 percent by weight of the total and being preferably a polymer, such as an immiscible polyolefin, polystyrene or a polyester, the compatibilizing block copolymer if present is provided at about 0.5 percent to about 25 percent by weight of the total, the process comprising the steps of:

a) preparing an immiscible blend system comprising the minor component uniformly dispersed in the major component, optionally further containing a compatibilizing block copolymer;

b) forming a non-porous precursor film of about 50 micrometers to about 300 micrometers in thickness from the immiscible blend system; and c) uniaxially or biaxially stretching the non-porous precursor film in at least two steps, the first step being a cold-stretching step in which the precursor film is stretched about 20 to about 30 percent at about 15° C. to about 25° C., and held under tension thereafter, and the second stretching step being a hot-stretching step at a temperature of about 10° C. to about 15° C. below the glass transition temperature of the minor component, the hot-stretching step increasing the dimension of the film to about 100% to about 700% of its original dimension.

In all of the foregoing aspects of the invention, the major component is preferably a polymer, for example a polyolefin, such as by way of non-limiting examples, polypropylene, polyethylene or poly(4-methyl-1-pentene). The minor component is immiscible with the major component and is preferably a polymer, such as another immiscible polyolefin, or polystyrene, polyester, and may be present at about 5 percent to about 25 percent by weight of the total. The major component and the minor component independently may be hydrophobic, hydrophilic, amorphous or semicrystalline. The blend of major component and minor component may be about 95:5 to about 75:25, however it is not so limiting. The extent of the increase in dimension of the precursor film to the final microporous membrane will depend on the selection of the components and their weight ratio, as well as the ratio of viscosity of the major to the minor component, the latter ratio controlling the domain size of the dispersed phase and hence the minimum attainable film thickness. It is also dependent on the optional presence of a compatibilizing block copolymer, of about 0.5 percent to about 25 percent by weight of the total, which allows for an increased stretching of up to about 600 percent to 700 percent of the original dimension of the precursor film. In addition, an optional further component may be present in the blend, such as a monomer, oligomer, or surfactant, one purpose of which is to provide certain desirable physicochemical characteristics to the surfaces of the microcrack network in the film. A non-limiting example of such additional components includes sodium dodecyl sulfate.

In a preferred embodiment of the foregoing aspects of the invention, the major component is polypropylene, and the minor component is polyethylene, polystyrene or a polyester such as poly(ethylene terephthalate). In more preferred embodiments, the ratio of polypropylene to polystyrene is 90:10 or the ratio or polypropylene to poly(ethylene terephthalate) is 85:15. In a blend containing a compatibilizing block copolymer, non-limiting examples include polypropylene:polystyrene 85:15 with about 7.5 percent by weight thereof block copolymer, and polypropylene:polystyrene 90:10 with about 5 percent thereof block copolymer. For this latter polymer blend, SEEPS is a preferred compatibilizing block copolymer.

The membranes or films preparable by the methods herein include not only flat films but other films or membranes of other shapes, such as but not limited to hollow membranes or fibers.

The minor component, when a polymer, may also be referred to as the first polymer component, and the major component, when a polymer, as the second polymer component.

It is thus an object of the present invention to provide a microporous membrane or film for use in separation processes, the membrane of film having domains of a first polymer component uniformly distributed in a matrix of a second polymer component, said second polymer component matrix comprising a three-dimensional network of uniformly distributed, interconnected microcracks of uniform dimension having a pore size of about 1 nanometer to about 200 nanometers and having a porosity of about 5 percent to about 40 percent, the membrane prepared from a film-forming composition, said film-forming composition consisting essentially of a mixture of a first polymer component in an amount of from about 1 percent by weight to about 25 percent by weight, and a second polymer component immiscible with said first polymer component and blended therewith, said second polymer component present in an amount ranging from about 65 percent by weight to about 99 percent by weight.

In one embodiment, the dimension of the microcracks is about 1 to about 10 nanometers or about 10 to about 20 nanometers. It can be as large as about 200 nm. The first and second polymer components may independently be amorphous, semicrystalline, hydrophilic or hydrophobic; they independently may be a polyolefin, such as polypropylene, polyethylene, or poly(4-methyl-1-pentene); polystyrene; or a polyester such as poly(ethylene terephthalate). In a non-limiting example, the first polymer component is 15 percent by weight poly(ethylene terephthalate) and the second polymer component is 85 percent by weight polypropylene; in another example, the first polymer component is 10 percent by weight polystyrene and the second polymer component is 90 percent by weight polypropylene.

In a further embodiment, the film may further include about 0.5 percent to about 25 percent by weight of a compatibilizing block copolymer. In a non-limiting example, a film may contain the compatibilizing block copolymer SEEPS, said first polymer is polystyrene and said second polymer is polypropylene; in one embodiment, a film is 10% by weight polystyrene, 90% by weight polypropylene, and about 5 percent by weight thereof SEEPS. In another embodiment, a film is 15% by weight polystyrene, 85% by weight polypropylene, and about 7.5 percent by weight thereof SEEPS. Another component, a monomer, an oligomer, a polymer, or a surfactant, may also be included in the mixture, with or without the compatibilizing block copolymer, to impart certain characteristics to the surfaces of the microcracks in the second or major component.

It is another object of the invention to provide for a method for the preparation of a microporous membrane useful in separation processes, the microporous membrane comprising domains of a first polymer component uniformly distributed in a matrix of a second polymer component, said second polymer component matrix comprising a three-dimensional network of uniformly distributed, interconnected microcracks of uniform dimension having a pore size of about 1 nanometer up to about 200 nanometers and having a porosity of about 5 percent to about 40 percent, said method comprising:

A. preparing a film-forming composition, said film forming composition consisting essentially of a mixture of a first polymer component in an amount of from about 1 percent by weight to about 35 percent by weight, a second polymer component immiscible with said first polymer component and blended therewith, said second polymer component present in an amount ranging from about 65 percent by weight to about 99 percent by weight;

B. preparing a film from the composition of step A; and

C. subjecting the film prepared in step B to a stretching procedure whereby said film is stretched at least 100% beyond the unstretched dimensions, whereby the final microporous membrane is formed.

The film may be prepared, by way of non-limiting example, a casting, spray application to a substrate, extrusion, or any process for forming a film. After forming the film, the stretching procedure comprises a first cold stretching step followed by at least one hot stretching step. The cold stretching step is performed at a temperature of from about 15 C to about 25 C, and said film is thereby stretched to from about 20% to about 30% over its original dimension. The hot stretching step is performed at a temperature ranging from about 10 C to about 15 C below the glass transition temperature of the first polymer component, said hot stretching performed to the attainment of a final dimension ranging from about 100% to about 400% of the original dimension of the unstretched film.

In an optional further step, the film may be further treated by annealing under tension at a temperature of about 5 C. to about 10 C higher than the hot stretching step, but below the glass transition temperature of said first polymer component.

In another embodiment of the invention, the mixture further comprises a compatibilizing block copolymer, added to the film forming composition by the simultaneous mixture of the first and second polymer components and the compatibilizing block copolymer; or, the first polymer component and the compatibilizing block copolymer may be blended first, and subsequently mixed with the second polymer component. The formation of the film, and post-film-forming steps including stretching and optional post-stretching annealing may be in accordance with any of the examples as described above, but it is not so limiting.

It is yet a further object to provide a microporous membrane for use in separation processes, said microporous membrane comprising domains of a first polymer component uniformly distributed in a matrix of a second polymer component, said second polymer component matrix comprising a three-dimensional network of uniformly distributed, interconnected microcracks of uniform dimension with a pore size of about 1 nanometer to about 200 nanometers and a porosity of about 5 percent to about 40 percent, said microporous membrane prepared by the steps of:

A. preparing a film-forming composition, said film forming composition consisting essentially of a mixture of a first polymer component in an amount of from about 1 percent by weight to about 35 percent by weight, a second polymer component immiscible with said first polymer component and blended therewith, said second polymer component present in an amount ranging from about 65 percent by weight to about 99 percent by weight;

B. preparing a film from the composition of step A; and

C. subjecting the film prepared in step B to a stretching procedure whereby said film is stretched at least 100% beyond the unstretched dimensions, whereby the final microporous membrane is formed.

The various means for forming the film, carrying out the stretching procedures, optional post-stretching annealing, are as described above. Furthermore, the a compatibilizing block copolymer may be included in the mixture, as described hereinabove, and the various processes inclusive thereof as exemplified above. An optional microcrack surface modifying component may also be included.

These and other aspects of the present invention will be better appreciated by reference to the following drawings and Detailed Description.

DETAILED DESCRIPTION OF THE INVENTION

Figure 1:
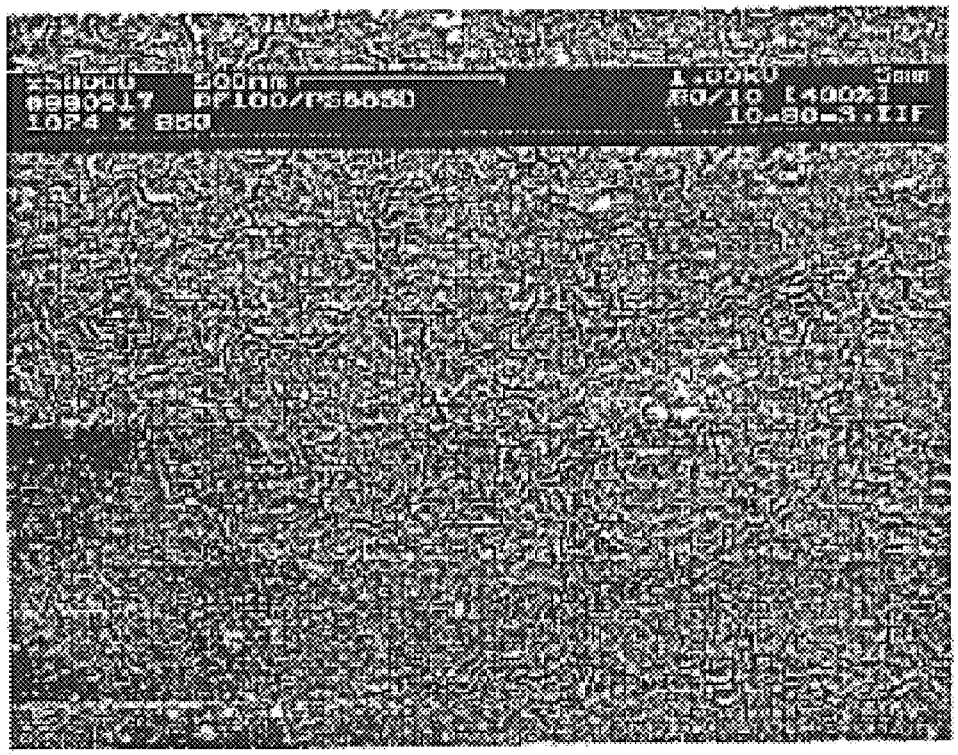
FIG. 1 is a scanning electron micrograph of a microporous film based on 90/10 weight percent polypropylene/polystyrene blend (50,000×magnification).

If appearing herein, the following terms shall have the definitions set out as follows. The terms "membrane" and "film" when used herein to refer to the product or process of the invention, are used interchangeably herein to refer either to the formed precursor film or the final stretched film, or any step during the process. The terms "microporous film" or "microporous membrane" are used to describe the finished product. The terms "network", "reticulated", "interconnected", "three-dimensional", "microcracks", "microvoids", "microchannels", "pores" and "crazing", and their syntactic variants, refer interchangeably and additively to describe the structure of the interconnected openings or spaces formed in the film of the invention that extend from one surface of the film to the other surface following the stretching steps. The figures show in scanning and transmission microscopy the structure of the film, its filtration properties arising from ability of molecules to pass from one side of the film to the other through the interconnected passageways. "Relatively uniform dimensions" refers to the low variance of the pore size (size of channels) and porosity (percent open space within the film) of the films of the invention, or the small range around the mean pore size exhibited by the films as prepared herein. Values of polymer components are expressed in weight percent, for example, 90:10 refers to 90% of the second component by weight, and 10% of the first component by weight.

When a third component, such as compatibilizing block copolymer, is included in the blend or mixture, although it is expressed herein as a percent, for example, as 5%, it refers to an additional 5 parts by weight added to the already one hundred parts total weight of the first and second polymer components combined, or in other words, 90:10:5.

The invention is directed broadly to microporous films prepared from immiscible blends of at least two components, preferably polymers, which are produced via melt processing, a film formed therefrom, for example by extrusion and post-film-forming treatments comprising uniaxial or biaxial cold-stretching and hot-stretching. As will be seen in the examples and figures herein, the films have a heretofore unknown structure, comprising a three-dimensional reticulated or interconnected network of microcracks or crazing throughout the film, extending from one surface of the film to the other, providing a stable porosity and pore size useful for a variety of filtration and other applications. By selecting the components of the film and the conditions for preparation, one of skill in the art may prepare a microporous film with desirable parameters for a particular application, such parameters including but not limited to membrane strength, thickness, porosity, pore size, flow rate of permeant, operating temperature and pressure tolerances, among others. For example, certain membranes prepared hereby have considerable transport and mechanical properties that are suitable for membrane processes that operate at 2 to 10 bars. The films furthermore exhibit chemical resistance and also can be used in high-temperature environments. The processes described herein and the films or membranes prepared by these processes have several advantages over other membrane fabrication processes: no solvents are required; a high production rate is achieved resulting in lower production cost; and inexpensive materials such as polypropylene (PP), polystyrene (PS), and a polyester such as poly(ethylene terephthalate) (PET) can be used as starting materials. The films may also be prepared in the form of hollow, microporous membranes.

The films of the invention may be characterized by comprising at least a major polymer and a minor polymer immiscible therein uniformly dispersed therein. As prepared by a melt process, the cast film, prior to post-film-forming processing, comprises a uniform dispersion of the minor polymer within the continuous phase of the major polymer. Such films prior to post-film-forming processing may have a thickness of 50 to 300 micrometers, although this may be varied depending on the application. These and other thickness values merely serve as a guide and are not intended to be limiting.

The morphology of the precursor film is important for the membrane structure and its properties, and a skilled artisan in following the teachings herein may readily select the components and fabrication methods and prepare a film with desirable properties for a particular application. The morphology of blends in the film depends strongly upon the rheological properties of materials and processing conditions such as screw configuration, temperature, cooling rate, drawing conditions, etc. The viscosity ratio of the materials strongly affects the morphology of the blends. The PP/PS system having a viscosity ratio of 1 has a much finer dispersed phase (1–2 $\mu$m) compared to the PP/PET system (4–7 $\mu$m), with a viscosity ratio larger than 1.

In the post-film-forming steps, the pores are formed during a stretching process which may be, by way of non-limiting example, increase the dimension from that of the precursor film in the machine direction to about 100 percent to about 700 percent. The extent of stretching depends on the components, their ratios in the blend and their rheological properties, and after the extent of stretching at which the film tears is determined, a suitable extent of stretching to form the microporous membrane without tearing may be readily determined. Depending on the composition of the film, when the films are stretched in the machine direction more than a certain amount, the films start breaking parallel to the machine direction. For example, PP/PET films which contain 10–20 weight percent PET can be stretched in the transverse direction up to 400% with respect to the original length. Thus, the PP/PET films can be biaxially stretched. This feature of the films can be employed to enlarge their pore dimensions. However, the PS/PP films with 10–20 weight percent PS can not be stretched in the transverse direction due to their brittleness.

The cold-stretching step is carried out at about 15° C. to about 25° C., and the nonporous precursor film in stretched about 20 to about 30 percent of its original dimension, uniaxially or biaxially. After the cold-stretching step, the stretched film is held under tension, and the hot-stretching step carried out. Hot stretching is carried out at a temperature of about 5° C. to about 15° C. below the glass transition temperature of the minor component. The film is hot stretched to a final dimension of about 100 percent to about 700 percent of the original dimension of the precursor film. As noted above, the extent of total stretching is dependent on the components of the blend, their ratios and viscosities, and once the extent of stretching that results in tearing is determined, the extent of desirable stretching to form the microporous membrane of the invention is readily determinable.

After the blend films are cold-stretched and heat-treated, they changed from opaque to milky-white indicating the forming of crazes. The yielding area of the stretched film exhibits stress whitening. The stress-whitened area is uniform across the film.

After stretching, the films of the invention optionally may be annealed under tension at a temperature of about 5° to about 10° C. above the hot-stretching temperature, but still below the glass transition temperature, for about 10 to about 15 minutes, to further stabilize the porous structure.

The lower limit of the pore sizes of the films of the invention are heretofore unachievable in other membranes prepared with the ease and facility, and of low-cost components, particularly in membranes formed from a polymer blend, as described herein. The present methods result in pore sizes down to about 1 nm, although even smaller pore sizes are achievable using particular polymer blends and conditions. As noted, the variance of the pore size is small compared to other microporous membranes; an exemplary binary-blend PP/PS 90:10 film has a mean surface pore size of 10.1 nm, and range of 4.4 to 15.7 nm. An exemplary ternary blend film of PP/PS/SEEPS 90:10 (5% SEEPS) has a mean surface pore size of 5.3 nm, with a range of 3.1 to 10.1 nm. The corresponding pore size within the membrane are slightly larger but of corresponding small variance. The films of the membrane may have a pore size of about 1 nm or less, or in the range of about 1 nm to about 5 nm, about 5 nm to about 10 nm, about 10 nm to about 20 nm, about 20 nm to about 50 nm, about 50 nm to about 100 nm, about 100 nm to about 200 nm.

In a further and preferred embodiment, the polymer blends and resultant films of the invention may also include a compatibilizing block copolymer, the inclusion of which makes the precursor films easier to stretch, allows for an increased stretch ratio of up to about 700 percent of the original dimension of the precursor film, provides for better uniformity of pore size throughout the film. Inclusion of the compatibilizing block copolymer reduces the size of the inclusion particles of the minor component in the film matrix. During the fabrication of the film of the invention, the compatibilizing block copolymer is preferably premixed with the minor component before the major component is blended therein (i.e., a two-step process), although the major, minor and compatibilizing block copolymer may be blended simultaneously (i.e., a one-step process). The former provides a greater permeant flow rate than the latter, other conditions being the same. By way of theory, for which Applicants have no duty to disclose and are not bound in any way thereby, the compatibilizing block copolymer, composed of hard and soft blocks, localizes at the interface between the major and minor components and strengthens the interface between them during the stress applied to the film during the stretching steps. The behavior of stress distribution changes in the film lead to different modes of microcrack formation, depending on both the concentration and mode of addition of the compatibilizing block copolymer (e.g., a one-step or two-step process, as described elsewhere herein) during melt mixing. The size, size distribution and shape of the dispersed phase are important factors which determine the structure of the membrane and are controlled by adjusting processing conditions as well as concentrations of the dispersed phase and copolymer. These conditions may be readily selected by the skilled artisan to fabricate a precursor film of desired properties. The compatibilizing block copolymer is believed to coat the inclusion particles or domains of the minor component within the blend and thereby strengthens the interface between the minor component inclusions and the major component. This increases the stress that may applied to the membrane during the stretching steps without tearing the membrane, and permits the fabrication of a three-dimensional network of finer (smaller) pores or microcracks in the matrix of the major polymer. While the polymer blends without a compatibilizing block copolymer may typically be stretched to a maximum of about 400 percent of the original dimension of the preformed film, a similar mixture also including a compatibilizing block polymer may typically be stretched up to about 700 percent. These values are merely illustrative of the properties of one example of the films of the invention.

The major component is preferably a polymer, for example a polyolefin, such as by way of non-limiting examples, polypropylene, polyethylene or a poly(4-methyl-1-pentene). The minor component is immiscible with the major component and is preferably a polymer, such as another immiscible polyolefin, or polystyrene or a polyester, and may be present at about 5 percent to about 25 percent by weight of the total. The major component and the minor component independently may be hydrophobic, hydrophilic, amorphous or semicrystalline. The blend of major component and minor component may be about 95:5 to about 75:25, however it is not so limiting. In one example, the polymers are immiscible polyolefins, such as the combination of polypropylene and polyethylene. Examples of polymers useful herein include polypropylenes PF100 and PF814 from Montell Polyolefins; polystyrene 685D from Dow Chemical Co., and poly(ethylene terephthalate) (PET) 9506 from Shell Chemicals, yet these are merely illustrative as a large selection is available for the practice of the present invention. Other useful polymers include cellulose acetate; nylon-6; nylon-6,6; polyimide, polysulfone, polyethersulfone, and polyvinylidenefluoride. Copolymers are also useful for the major (second) and/or minor (first) polymeric components, such as copolymers of ethylene and propylene. Such examples or various polymers is merely illustrative and is not intended whatsoever to be limiting, as the skilled artisan based on the teachings herein will readily select immiscible polymers from which to prepare a suitable film with the properties described herein.

When used as the minor component, the glass transition temperature ($T_g$) of the component is considered in determining the optimal temperature for carrying out the hot-stretch step. The extent of the increase in dimension of the precursor film to the final microporous membrane on stretching will depend on the selection of the components and their ratio, as well as the ratio of viscosity of the major to the minor component. It is also dependent on the optional presence of a compatibilizing block copolymer, of about 0.5 percent to about 25 percent by weight of the total, which allows for an increased stretching of up to about 600 percent to 700 percent of the original dimension of the precursor film, as compared to about 400 percent without it. An example of a compatibilizing block copolymer useful for enhancing a film prepared from a polypropylene/polystyrene blend is hydrogenated styrene isoprene/butadiene block copolymer (polystyrene-block-polybutadiene-block-polyisoprene-block-polystyrene copolymer; SEEPS), SEPTON 4033, from Kuraray America. For other blends of immiscible major and minor polymer components, one of skill in the art may select a commercially-available compatibilizing block copolymer or prepare one synthetically. These ratios and percent content of compatibilizing block copolymer are merely illustrative of one embodiment of the invention, and variations are fully embraced herein to achieve the desired properties of films in accordance with the described methods and structure of the microporous film of the invention.

As mentioned above, other components optionally may be included in the blend to achieve modifications of the properties of the microporous film as prepared herein. For example, the hydrophilicity or hydrophobicity of the surface of the film traversed by the permeant may be altered by including monomeric, oligomeric, polymeric or other compounds within the blend. Such modifications may enhance permeation by certain components or phases, or resist permeation of others. By way of non-limiting example, a surfactant or surface-active agent such as sodium dodecyl sulfate may be included in the blend. By way of theory, for which Applicants have no duty to disclose nor be bound by, at the surfaces of the microcracks, the surface may align with the hydrophobic portion within the matrix and the ionic portion at the surface, increasing the hydrophilicity of the channels or pores through the membrane and increasing the permeability to a hydrophilic solvent or components therein, and reducing the permeability to hydrophobic components.

The films of the invention may be used in separation applications involving solids, liquids and gases, in any combination, for use in such diverse fields as medical, industrial, apparel, food and packaging applications. Such applications include, but are not limited to, in the medical field as non-adherent dressings, burn dressings, and endotracheal tube cuffs; in the filtration field for alkaline battery separators, lead-acid battery separators, bacterial filters, dialysis membranes, industrial or laboratory ultrafiltration applications, oxygenation supports, reverse osmosis supports, and water purification; for industrial degassing applications; in the insulation and protective barrier applications including acoustical film, mattress ticking, sleeping bag fabric, tarpaulins, tent fabric, thermal blankets; for sterile packaging; in the disposables area for diaper covers, disposable protective clothing, operating room pack and drape; in the apparel field as apparel lining, raincoats, shoe linings; in the household area as travel bags, upholstery fabric backing; and in the tape, wrap and packaging applications as agricultural produce wrap, cable wrap, capacitor wrap, controlled-environment packaging, industrial tape, non-fogging packaging and as a controlled-release desiccator for anhydrous fluids. These uses and applications are merely illustrative, non-limiting examples of the variety of applications for the microporous membranes of the invention.

In one example of a new application using the present film, a self-sealing, unitary battery separator may be prepared using the binary or ternary blend film of the invention. Overheating of the battery will cause melting of the minor component of the membrane and sealing of the pores of the membrane, stopping the electrochemical transport across the membrane and the heat condition arising therefrom. Such a film may prevent leakage and fires caused by certain types of batteries.

As mentioned herein, one aspect of the methods and materials of the invention are flat membranes or films prepared by casting, extrusion, or any other film-forming methodology. However, the invention is not so limiting, and is extended to films and membranes of other shapes and dimensions, such as but not limited to hollow fibers or hollow membranes. Such materials may be prepared by following the teachings of the invention and carrying out the stretching steps along the axis of the fiber. Such microporous hollow membranes with pore sizes as small as about 1 nm, and up to about 200 nm, have numerous applications in the filtration and medical fields such as described above, and in addition to the fabrication or artificial filtering organs such as the kidney and spleen; biocompatible delivery devices for biomolecules and other pharmaceutical agents, growth and harvesting chambers for cells including implantable living-cell-containing devices which secrete biologically active molecules but are protected from immune surveillance by the membrane, and other industrial and medical applications, to name only a few. The small porosities achievable by the methods herein offer new surfaces and membrane-bound chambers for a variety of such applications for which prior art membranes of larger pore sizes and structural characteristics were unsuitable.

In examples of the preparation of membranes or films of the invention, polystyrene (PS)/polypropylene (PP) and poly (ethylene terephthalate) (PET)/polypropylene (PP) binary blend systems with different viscosity ratios were studied. The blends were first compounded in a co-rotating twin-screw extruder and subsequently extruded through a sheet die to obtain the precursor films. These were uniaxially or biaxially drawn (100–400%) with respect to the original dimension to induce microporous structure and post treated at elevated temperature to maintain the porous structure which consisted of uniform microcracks in the order of a few hundred nanometers.

Figure 2:
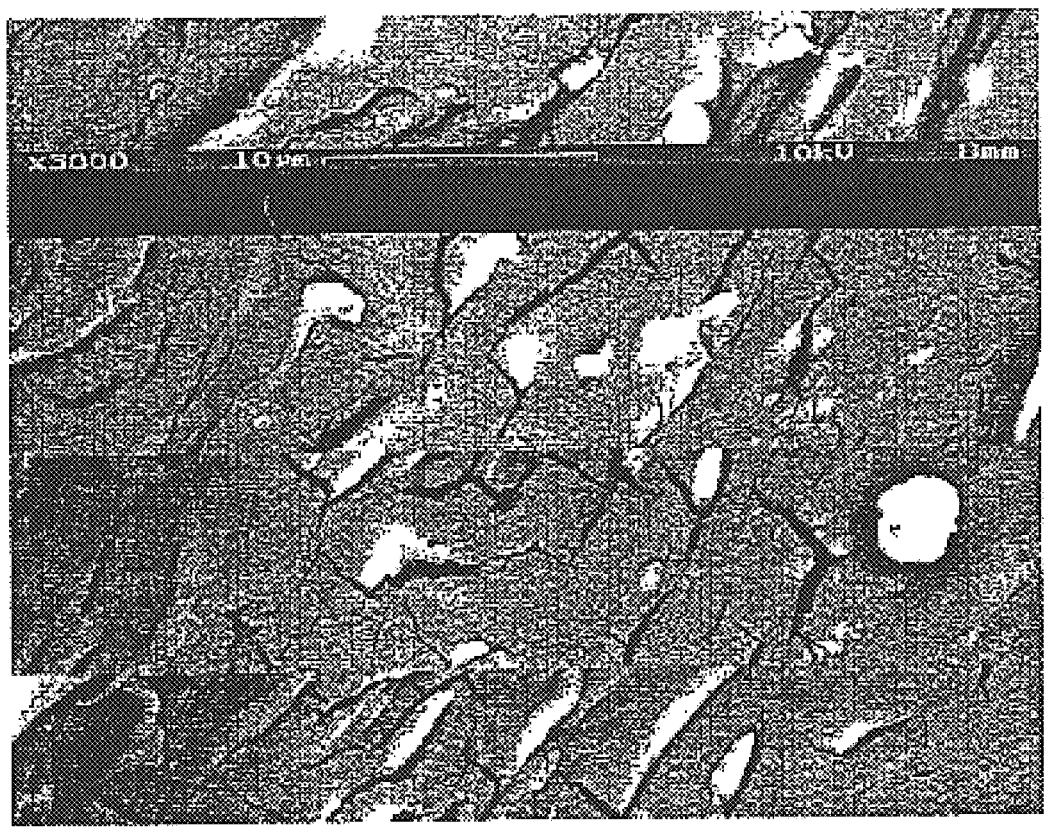
FIG. 2 is a transmission electron micrograph illustrating a cross section of microporous membrane based on polypropylene/polystyrene 90/10 weight percent blend; 3,000×magnification.
Figure 3:
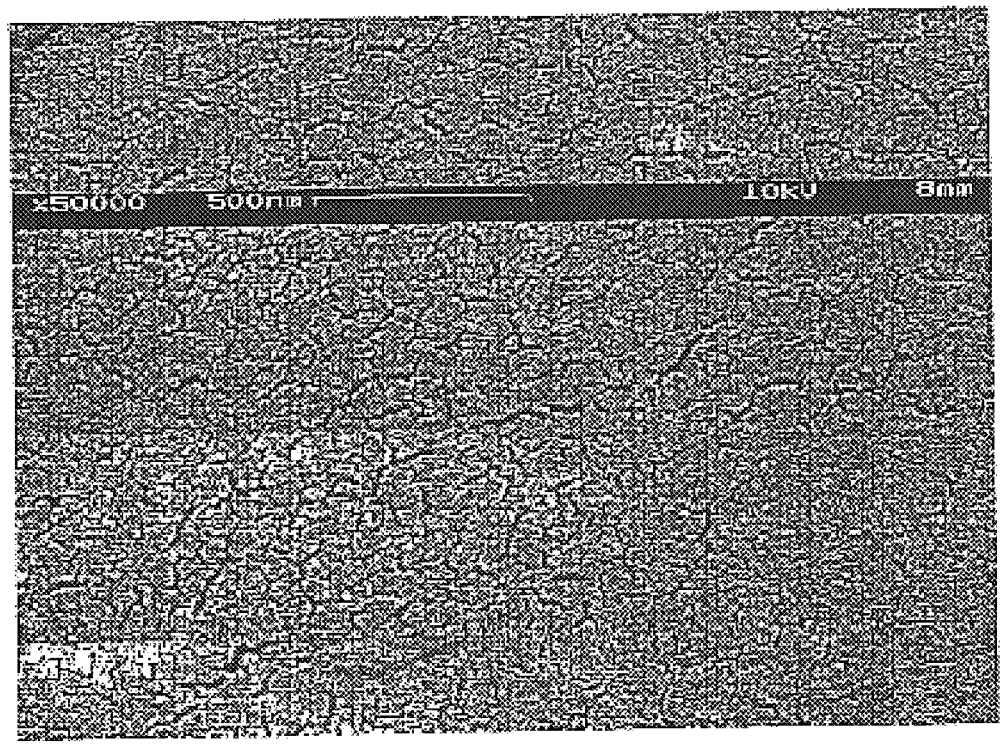
FIG. 3 is the same cross-sectional image as FIG. 2 but at a 50,000×magnification.
Figure 5:
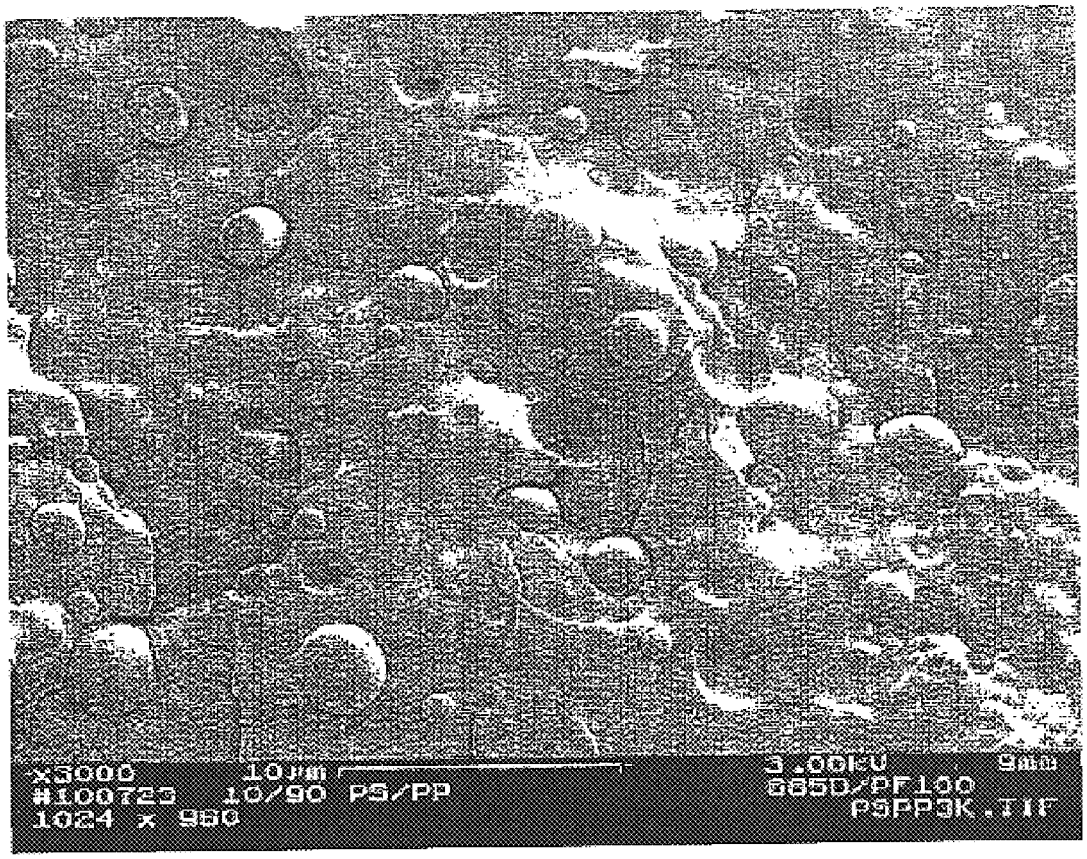
FIG. 5 shows a scanning electron micrograph of a polystyrene/polypropylene 10:90 blend, before stretching.

The figures illustrate the properties of examples of the films of the invention by microscopy. FIGS. 1-3 and 5 relate to films formed from a binary system (without a compatibilizing block copolymer), and FIGS. 6-8 include a compatibilizing block copolymer. FIG. 1 is a scanning electron micrograph of a 90/10 weight percent polypropylene/polystyrene blend, showing the network of microcracks on the surface; FIG. 2 shows by transmission electron microscopy a cross section of the same membrane, and in FIG. 3 at a higher magnification. FIG. 5 is a scanning electron micrograph of the surface of the same membrane, before stretching, showing the inclusion particles of the minor component (polystyrene) dispersed within the major component (polypropylene).

Figure 6:
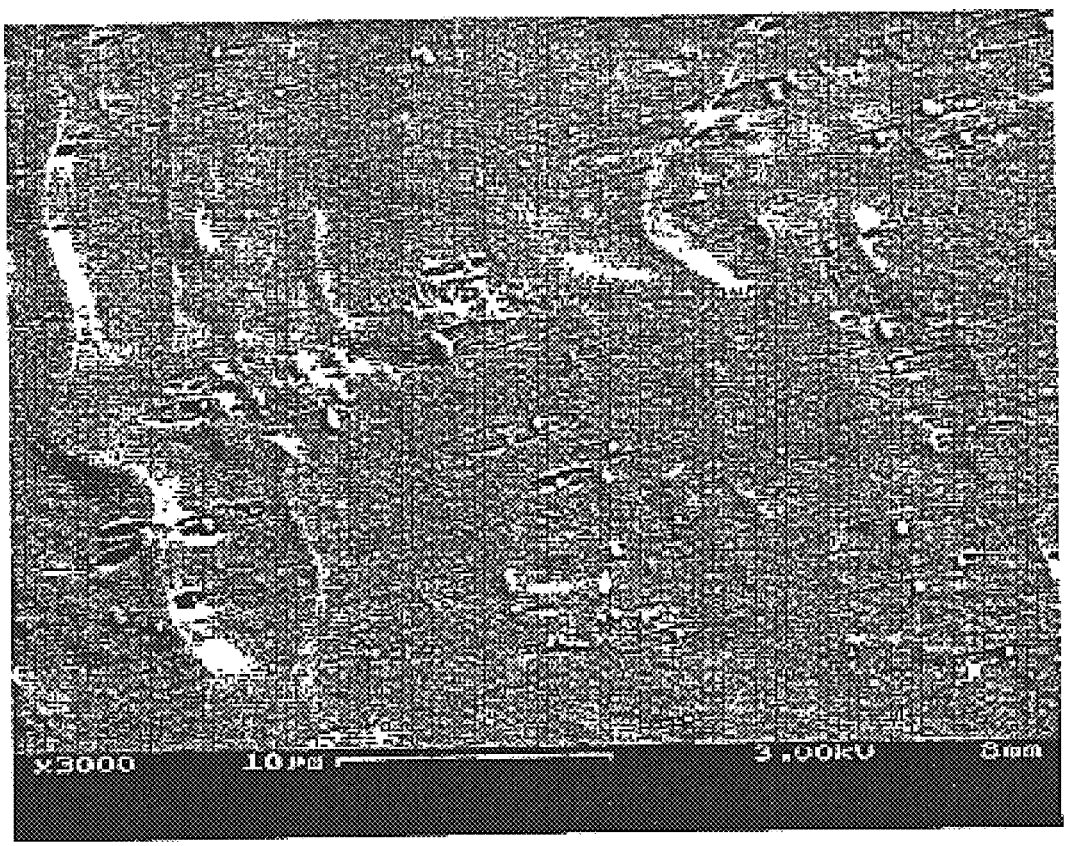
FIG. 6 is a scanning electron micrograph showing the surface after stretching of a film of the invention based on a polypropylene/polystyrene/SEEPS blend; magnification×3,000.
Figure 7:
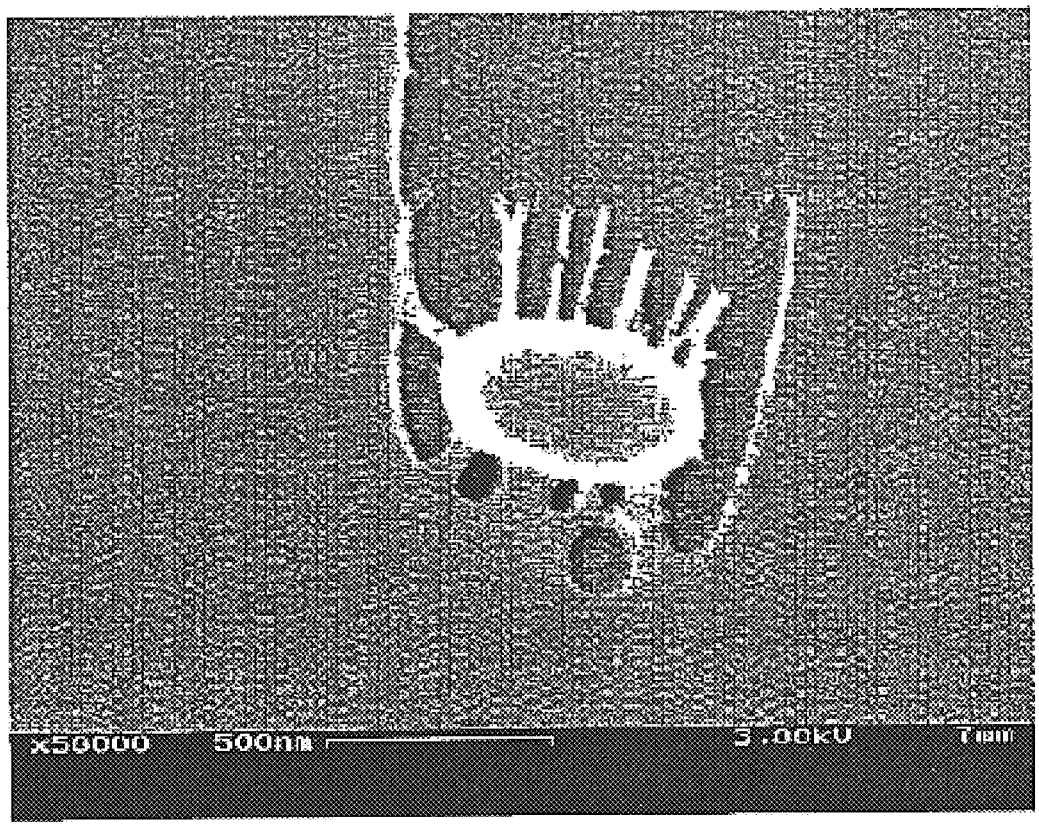
FIG. 7 is a scanning electron micrograph showing the surface after stretching of a film of the invention based on a polypropylene/polystyrene/SEEPS blend; magnification× 50,000. The separation of the major polymer from the inclusion particle of the minor polymer is shown. The network of microcracks comprise the entire area of major polymer shown.
Figure 8:
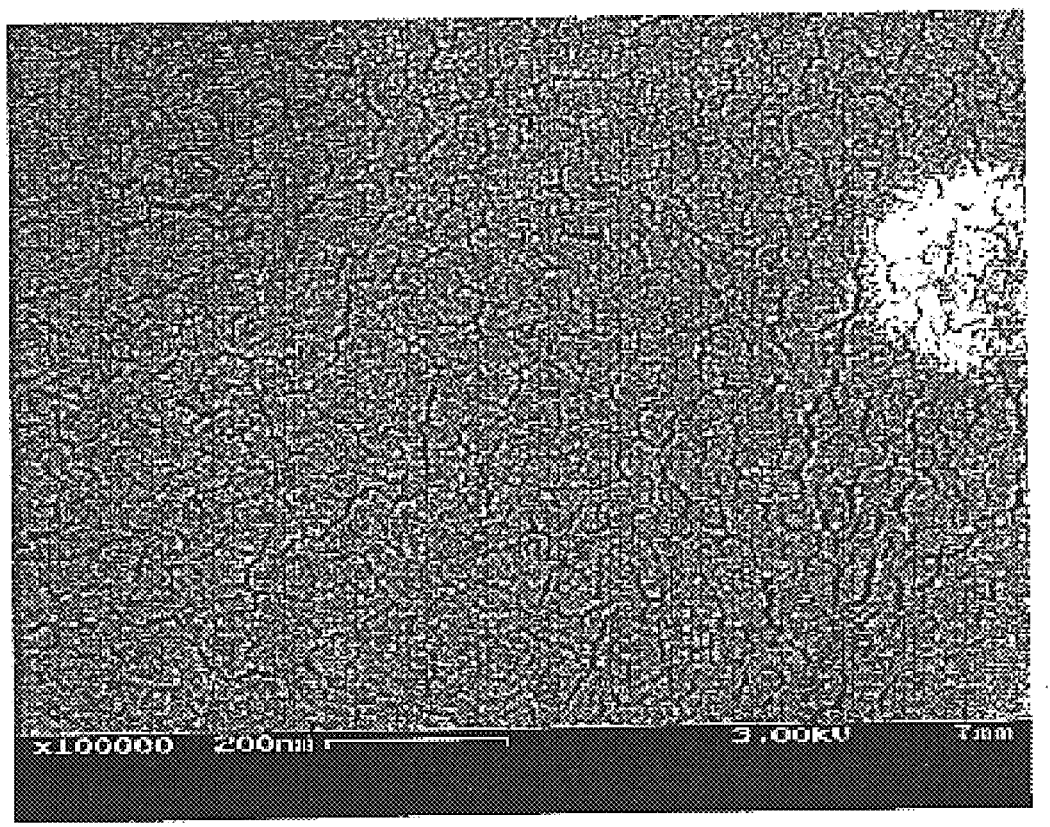
FIG. 8 is a scanning electron micrograph showing the surface of a film of the invention based on a polypropylene/polystyrene/SEEPS blend; magnification×100,000.

FIG. 6 is a scanning electron micrograph showing the surface after stretching of a film of the invention based on a polypropylene/polystyrene/SEEPS blend. Several pits oriented parallel to the stretching direction caused by a unique plastic deformation were observed on the surface of the film. FIG. 7, at higher magnification, shows a polystyrene dispersed-phase droplet with a copolymer shell. The copolymer forms a thin elongated fibrillated structure around the polystyrene domain. The observed phenomenon confirms that the interfacial adhesion between the homopolymers was greatly improved in the presence of the copolymer. The block copolymer promotes stress transfer across the interface, which will enhance a stress concentration in the matrix of the blend. This phenomenon initiates the formation of microcracks and introduces porosity in the films. The network of microcracks comprise the remainder of the entire area of major polymer surrounding the particle. At 100,000× magnification (FIG. 8), the structure of microcracks uniformly distributed on the film surface is clearly shown in the area of polypropylene surrounding the polystyrene domain.

In further studies, the compatibilizing block copolymer SEEPS was included in the polypropylene/polystyrene polymer blends at about 5% or 7.5% by weight of the total. In such ternary systems, coating of the inclusion particles of the minor component provides increased interfacial adhesion between the major and minor polymers and the attendant ability of the extruded film to withstand increased stress during the stretching steps, resulting in a finished film with smaller pores or microcracks. The width of the microcracks is ranging from 40–200 angstroms. The addition of the block copolymer to the immiscible blend had remarkable effects on the membrane structure. The density and the uniformity of the microcracks are significantly improved in comparison to the binary blends without the copolymer.

Figure 4:
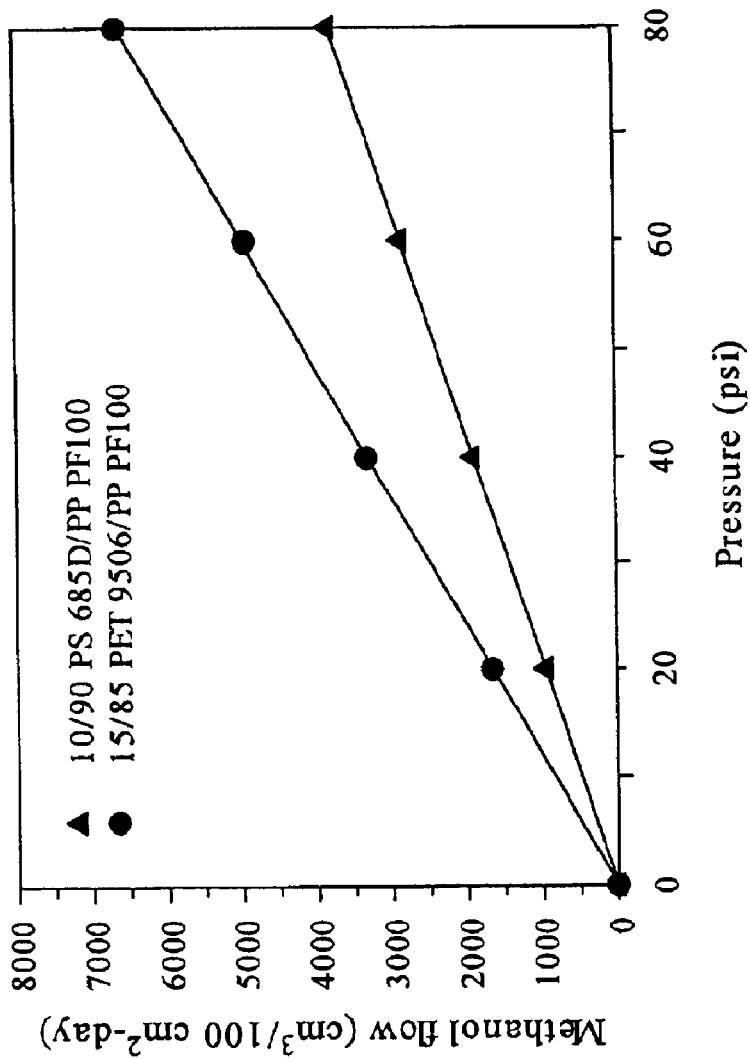
FIG. 4 depicts plots showing permeability of methanol through microporous films at different pressures at 20° C. of 90/10 weight percent polypropylene/polystyrene film and 85/15 weight percent polypropylene/poly(ethylene terephthalate) film.

Permeability of a solvent through the microporous films was measured at different applied pressures ranging from 20 to 80 psi. Methanol was used as a solvent for the permeability test. It was found that the permeability increases linearly with increase in the applied pressure The permeability of the membranes based on the ternary blend of polystyrene/polypropylene/copolymer is ranging from $2 \times 10^3$ to $2 \times 10^4$ cm$^3$/(100 cm$^2$-day) (FIG. 9) and is higher than that of the binary blends without the copolymer (FIG. 4).

The following examples are presented in order to more fully illustrate the preferred embodiments of the invention. They should in no way be construed, however, as limiting the broad scope of the invention.

EXAMPLE 1

Two different immiscible blend systems were explored: (a) Polystyrene (PS)/polypropylene (PP) blends; (b) poly (ethylene terephthalate) (PET)/polypropylene (PP) blends. Pores were introduced by debonding of the amorphous/ amorphous or amorphous/crystalline phases of the blend systems. Different processing and post-treatment conditions were studied to relate processing condition and membrane structure. The effects of phase morphology, degree of dispersion, adhesion of the membrane components as well as post-extrusion orientation have to be studied to relate blend morphology with membrane properties.

The materials used in the experiments include: a Montell PF-100 polypropylene homopolymer (PP); a Dow Chemicals 685D polystyrene (PS); a Shell 9506 poly(ethylene terephthalate) (PET). All materials used in the experiments were characterized using a dynamic mechanical spectrometer (Rheometric Scientific RMS-800). The microporous films from immiscible blends were produced via melt processing and post-extrusion treatments. Melt blending was carried out in an intermeshing co-rotating twin-screw extruder (Leistritz LSM 30, D=27 mm, L/D=35). The screw configuration consisted of conveying elements, kneading blocks, and other mixing elements. The polymers were dry blended and fed into the extruder at a rate ranging from 4 to 8 kg/h. The mixing screw was operated at 60–80 $min^{-1}$. The barrel temperature was set at 230° C. for PP/PS system and 270° C. for PP/PET system. The gate and the die were also kept at the same temperature as the barrel. The blends were melt extruded, chilled, and then pelletized. The films were formed in a single-screw extruder (Welex PEZS 14, D=1.25 in. L/D=24) equipped with a 10-inch coat-hanger flat sheet die. The melt was subsequently passed through a series of chilled rolls to obtain the nonporous precursor cast films.

The microporous films were prepared from melt-extruded precursor films that were opaque. The post-step treatments used for the preparation of microporous membranes from blends include several interrelated steps:

1) The precursor films were uniaxially or biaxially drawn (20–30%) with respect to the original dimension at a temperature ranging from 15° C. to 25° C. to induce interphase debonding followed by crazing in the major (also referred to as second) component or phase. The growth of crazes is controlled by the degree of applied stress and drawing temperature.

2) The films were subsequently drawn at temperatures 5° C. to 15° C. lower than the glass transition temperature of the minor phase by a series of stretching processes.

The films were examined using a low voltage scanning electron microscope (Leo 982 SEM). Transport properties were characterized by liquid permeation measurements.

In the mixing of immiscible blends, the minor component (PS and PET) is dispersed uniformly in the continuous phase of the major component (PP). The precursor films produced by melt extrusion have thickness ranging from 50–100 μm. The morphology of blends in the film is based upon rheological properties of materials and processing conditions such as screw configuration, temperature, cooling rate, drawing conditions, etc. Viscosity ratio of materials contributes to the morphology of the blends. In this example, the PP/PS system having a viscosity ratio of 1 has much finer dispersed phase (1–2 μm) compared to the PP/PET system (4–7 μm), with a viscosity ratio larger than 1.

The films from both PP/PS and PP/PET can be stretched in the machine direction to 100–400% with respect to the original dimensions at room temperature at temperatures lower than the glass transition temperature of the minor component or phase (first polymeric component). When the films are stretched in the machine direction more than 400%, the films start breaking parallel to the machine direction. The PP/PET films which contain 10–20 weight percent PET can be stretched in the transverse direction up to 400% with respect to the original length. Thus, the PP/PET films can be biaxially stretched. This feature of the films can be employed to enlarge their pore dimensions. However, the PS/PP films with 10–20 weight percent PS could not be stretched in the transverse direction due to their brittleness. After the blend films were stretched and heat-treated, they changed from opaque to milky-white indicating the forming of crazes. The yielding area of the stretched film exhibits stress whitening. The stress-whitened area is uniform across the film.

As a result of weak adhesion at the interface, the two components can be easily debonded when stress is applied. The growth of crazes is controlled by the magnitude of the applied stress and drawing temperature. The dimensions of the crazes are then enlarged by a series of stretching processes. Milky-white films obtained after these treatments were examined using a low voltage scanning electron microscope (Leo 982 SEM) and pore dimensions were estimated. Uniform microcracks that are in the order of a few hundred nanometers were found. Micrographs show that a network of microvoids of uniform dimension forms in the films during the post-step treatments.

Microscopy suggests that microporous structures are formed by a crazing mechanism. Shear yielding also occurs along with the crazing. In the blend systems, the minor phase that is well dispersed in the matrix acts as a stress concentrator. The porosity is induced by drawing the precursor film at a temperature below the glass transition temperature ($T_g$) of the minor phase. When the precursor film is deformed, the minor phase domains are debonded due to the weak adhesion between phases. Microcracks are initiated at points of high stress concentration which are at the interface between the two phases. Subsequent growth occurs by a process in which crazes propagate into the major phase of the blend. Rates of craze initiation and growth depend strongly upon applied stress condition and temperature.

The mean surface pore size for a PP/PS 90:10 film prepared as described above was 10.1 nm, with a minimum of 4.4 nm and a maximum of 10.1 nm. The porosity was 11.1%. The cross-sectional pores had a mean size of 12.0 nm, a range of 3.7 to 18.5 nm and a porosity of 8.4%.

Transport properties of membranes obtained from the process mentioned above were characterized by permeability measurements. Permeability of a solvent through the microporous films was measured at different applied pressures ranging from 140 to 550 kPa. Methanol was used as a solvent for the permeability test. It was found that the permeability increases linearly with increase in the applied pressure (FIG. 4). The permeability of the membranes based on PP homopolymer is ranging from $2 \times 10^4$ to $10^5$ $cm^3/(100\ cm^2\text{-day})$. For membranes based on blends, the permeability is one order of magnitude lower in a range of $10^3$ to $10^4$ $cm^3/(100\ cm^2\text{-day})$.

The membranes can withstand significant pressure drop. To test the mechanical strength of the membranes, 690-kPa pressure drop was applied for 72 hr. There was no change in properties at this testing pressure. The permeability of membranes based on blends is less than those based on single polymer. This is due to the smaller dimensions of the crazes formed in the polyblend membranes.

EXAMPLE 2

A ternary polymer blend was prepared in a similar fashion to that described in Example 1, using SEEPS as the compatibilizing block polymer. Blends were prepared using PP/PS 85:15 weight percent with 7.5% SEEPS, using a two-step mixing method, wherein the PS and SEEPS were preblended before the PP was added. A PP:PS 90:10 blend with 5% SEEPS was prepared by both a one-step (all blended together) and by a two-step method.

Films prepared as described in this and the previous example for comparison had the following surface and cross-section pore size (in nm) and porosity (in %):

|  | Surface Pores | | | | Cross-sectional pores | | | |
| --- | --- | --- | --- | --- | --- | --- | --- | --- |
| Composition and method | mean | min | max | porosity | mean | min | max | porosity |
| PP/PS 90:10 | 10.1 | 4.4 | 15.7 | 11.1 | 12.0 | 3.7 | 18.5 | 8.4 |
| PP/PS/SEEPS 90:10/5%, one step blending | 5.3 | 3.1 | 10.1 | 13.2 | 7.0 | 2.6 | 11.7 | 17.7 |
| PP/PS/SEEPS 90:10/5%, two step blending | 6.2 | 3.7 | 13.1 | 10.8 | 7.6 | 3.7 | 17.1 | 19.5 |
| PP/PS/SEEPS 85:15/7.5%, two step blending | 9.2 | 4.1 | 22.2 | 12.1 | 12.7 | 5.6 | 21.0 | 29.1 |

Prior membranes prepared by a solution process have the following surface pore parameters (pore size in nm; porosity in %; taken from Kim et al., 1990, Quantitative microscopic studies of surface characteristics of ultrafiltration membranes, J. Membrane Sci. 54:89):

|  |  | Surface Pores | | | |
| --- | --- | --- | --- | --- | --- |
| Composition | Polymer | mean | min | max | porosity |
| Amicon PM30 | Polysulfone | 4.0 | 1.5 | 9.8 | 5.9 |
| Amicon XM100A | Poly(acrylonitrile-co-vinylchloride) | 6.1 | 2.1 | 13.5 | 4.4 |
| Amicon XM300 | Poly(acrylonitrile-co-vinylchloride) | 8.6 | 2.1 | 22.3 | 6.4 |
| Millipore PTTK | Polysulfone | 4.8 | 2.5 | 6.4 | 5.5 |
| Millipore PTHK | Polysulfone | 9.2 | 1.5 | 45.9 | 9.9 |

Thus, it is apparent that the films of the instant invention prepared by stretching a film prepared from a melt process have at least the same or better pore size distribution as films made from a solution process.

Figure 9:
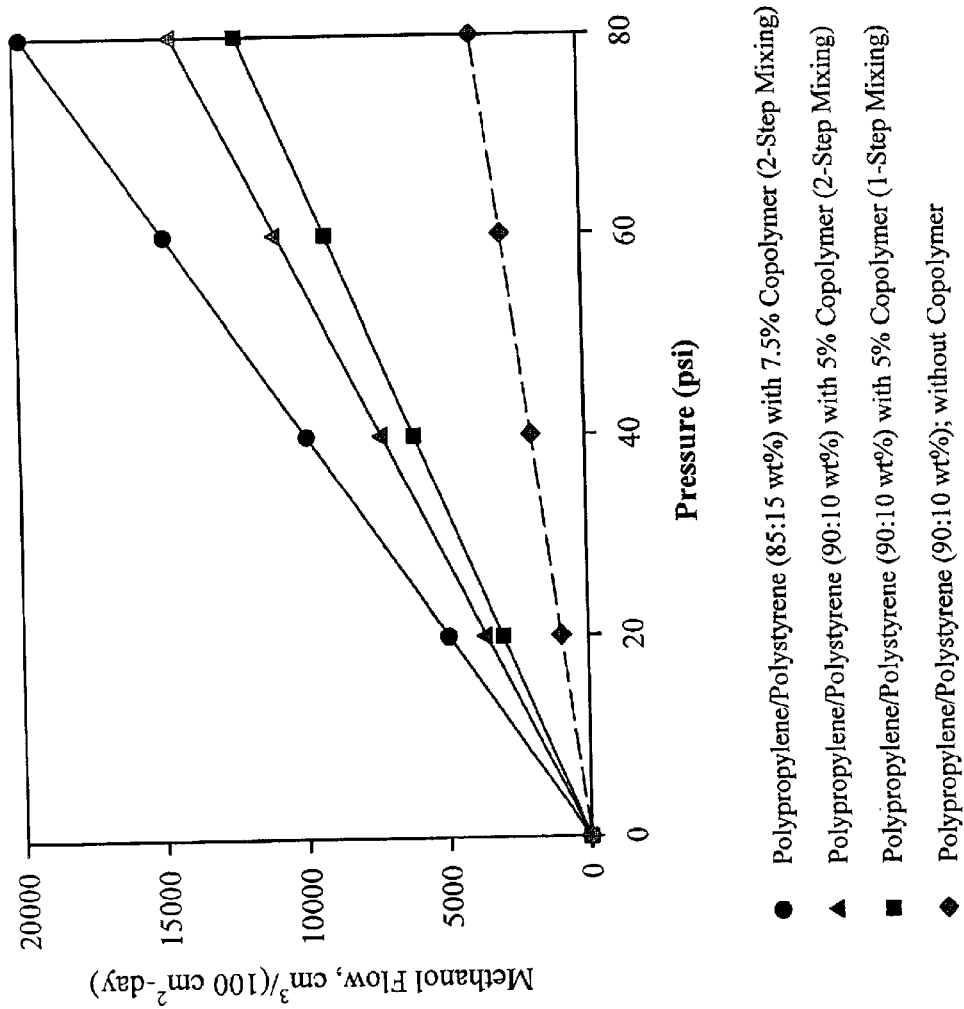
FIG. 9 plots the permeability of methanol through microporous membranes based on ternary blends containing a compatibilizing block copolymer (including different mixing methods) at different pressures at 20° C., compared to a binary blend.

The results of a methanol permeability study on the ternary films of the invention, compared to a binary PP/PS 90:10 blend film of the invention, is shown in FIG. 9.

While the invention has been described and illustrated herein by references to the specific embodiments, various specific material, procedures and examples, it is understood that the invention is not restricted to the particular material combinations of material, and procedures selected for that purpose. Indeed, various modifications of the invention in addition to those described herein will become apparent to those skilled in the art from the foregoing description and the accompanying figures. Such modifications are intended to fall within the scope of the appended claims.

Various publications are cited herein, the disclosures of which are incorporated by reference in their entireties.

What is claimed is:

1. A method for preparing a microporous membrane useful for separation processes, said microporous membrane comprising domains of a first polymer component uniformly distributed in a matrix of a second polymer component, said second polymer component matrix comprising a three-dimensional reticulated or interconnected network of uniformly distributed, microcracks of uniform dimension having a mean pore size of about 1 nanometer to about 200 nanometers and having a porosity of about 5 percent to about 40 percent, said method comprising:

A. preparing a film-forming composition, said film forming composition consisting essentially of a mixture of
 a first polymer component in an amount of from about 1 percent by weight to about 35 percent by weight,
 a second polymer component immiscible with said first polymer component and blended therewith, said second polymer component present in an amount ranging from about 65 percent by weight to about 99 percent by weight, and
 a compatibilizing block copolymer B. preparing a film from the composition of step A; and C. Subjecting the film prepared in step B to a stretching procedure whereby said film is stretched at least 100% beyond the unstretched dimensions, whereby the final microporous membrane is formed.

2. The method of claim 1 wherein said film is prepared by a casting process.

3. The method of claim 1 wherein said film is prepared by spray application of said composition to a substrate.

4. The method of claim 1 wherein said film is prepared by extrusion.

5. The method of claim 1 wherein said stretching procedure comprises a first cold stretching step followed by at least one hot stretching step.

6. The method of claim 5 wherein said cold stretching step is performed at a temperature of from about 15 C to about 25 C, and said film is thereby stretched to from about 20% to about 30% above its original dimension.

7. The method of claim 5 wherein said hot stretching step is performed at a temperature ranging from about 10 C to about 15 C below the glass transition temperature of the first polymer component, said hot stretching performed to the attainment of a final dimension ranging from about 100% to about 400% of the original dimension of the unstretched film.

8. The method of claim 5 wherein said film is further treated by annealing under tension at a temperature of about 5 C to about 10 C higher than the hot stretching step, but below the glass transition temperature of said first polymer component.

9. The method of claim 1 wherein said film forming composition is prepared by the simultaneous mixture of said polymer components.

10. The method of claim 1 wherein said film forming composition is prepared by the premixture of said first polymer component and said compatibilizing block copolymer, and the subsequent mixture thereof with said second polymer component.

11. The process of claim 1 wherein said film is prepared by a casting process.

12. The method of claim 1 wherein said film is prepared by spray application of said composition to a substrate.

13. The method of claim 1 wherein said film is prepared by extrusion.

14. The method of claim 1 wherein said stretching procedure comprises a first cold stretching step followed by at least one hot stretching step.

15. The method of claim 14 wherein said cold stretching step is performed at a temperature of from about 15° C. to about 25° C., and said film is thereby stretched to from about 20% to about 30% over its original dimension.

16. The method of claim 14 wherein said hot stretching step is performed at a temperature ranging from about 10 ° C. to about 15° C. below the glass transition temperature of the first polymer component, said hot stretching performed to the attainment of a final dimension ranging from about 100% to about 700% of the original dimension of the unstretched film.

17. The method of claim 14 wherein said film is further treated by annealing under tension at a temperature of about 5° C. to about 10° C. higher than the hot stretching step, but below the glass transition temperature of said first polymer component.

18. A microporous membrane for use in separation processes, said microporous membrane comprising domains of a first polymer component uniformly distributed in a matrix of a second polymer component, said second polymer comoponent matrix comprising a three-dimensional network of uniformly distributed, interconnected microcracks of uniform dimention with a mean pore size if about 1 nanometer to about 200 nanometers and a porosity of about 5 percent to about 40 percent, said microporous membrane prepared by the steps of:
  A. Preparing a film-forming composition, said film forming composition consisting essentially of a mixture of
    a first polymer component in an amount of from about 1 percent by weight to about 35 percent by weight,
    a second polymer component immiscible with said first polymer component and blended therewith, said second polymer component present in an amount ranging from about 65 percent by weight to about 99 percent by weight and
    a compatibilizing block copolymer;
  B. preparing a film from the composition of step A; and
  C. Subjecting the film prepared in step B to a stretching procedure whereby said film is stretched at least 100% beyond the unstretched dimensions,
    Whereby the final microporous membrane is formed.

19. The microporous membrane of claim 18 wherein said film is prepared by a casting process.

20. The microporous membrane of claim 18 wherein said film is prepared by spray application of said composition to a substrate.

21. The microporous membrane of claim 18 wherein said film is prepared by extrusion.

22. The microporous membrane of claim 18 wherein said stretching procedure comprises a first cold stretching step followed by at least one hot stretching step.

23. The microporous membrane of claim 22 wherein said cold stretching step is performed at a temperature of from about 15° C. to about 25° C., and said film is thereby stretched to from about 20% to about 30% of its original dimension.

24. The microporous membrane of claim 22 wherein said hot stretching step is performed at a temperature ranging from about 10° C. to about 15° C. below the glass transition temperature of the first polymer component, said hot stretching performed to the attainment of a final dimension ranging from about 100% to about 400% of the original dimension of the unstretched film.

25. The microporous membrane of claim 22 wherein said film is further treated by annealing under tension at a temperature of about 5° C. to about 10° C. higher than the hot stretching step, but below the glass transition temperature of said first polymer component.

26. The microporous membrane of claim 18 wherein said film forming composition is prepared by the simultaneous mixture of said polymer components.

27. The microporous membrane of claim 18 wherein said film forming composition is prepared by the premixture of said first polymer component and said compatibilizing block copolymer, and the subsequent mixture thereof with said second polymer component.

28. The microporous membrane of claim 18 wherein said film is prepared by a casting process.

29. The microporous membrane of claim 18 wherein said film is prepared by spray application of said composition to a substrate.

30. The microporous membrane of claim 18 wherein said film is prepared by extrusion.

31. The microporous membrane of claim 18 wherein said stretching procedure comprises a first cold stretching step followed by at least one hot stretching step.

32. The microporous membrane of claim 31 wherein said cold stretching step is performed at a temperature of from about 15° C. to about 25° C., and said film is thereby stretched to from about 20% to about 30% of its original dimension.

33. The microporous membrane of claim 31 wherein said hot stretching step is performed at a temperature ranging from about 10° C. to about 15° C. below the glass transition temperature of the first polymer component, said hot stretching performed to the attainment of a final dimension ranging from about 100% to about 700% of the original dimension of the unstretched film.

34. The microporous membrane of claim 31 wherein said film is further treated by annealing under tension at a temperature of about 5° C. to about 10° C. higher than the hot stretching step, but below the glass transition temperature of said first polymer componentclaim.

* * * * *